Aug. 23, 1960    V. W. PETERSON ET AL    2,949,771
TORQUE METER
Filed July 28, 1955    5 Sheets-Sheet 1

INVENTORS
Victor W. Peterson,
Herbert H. Schnepel &
Paul Bancel
BY Paul Fitzpatrick
ATTORNEY

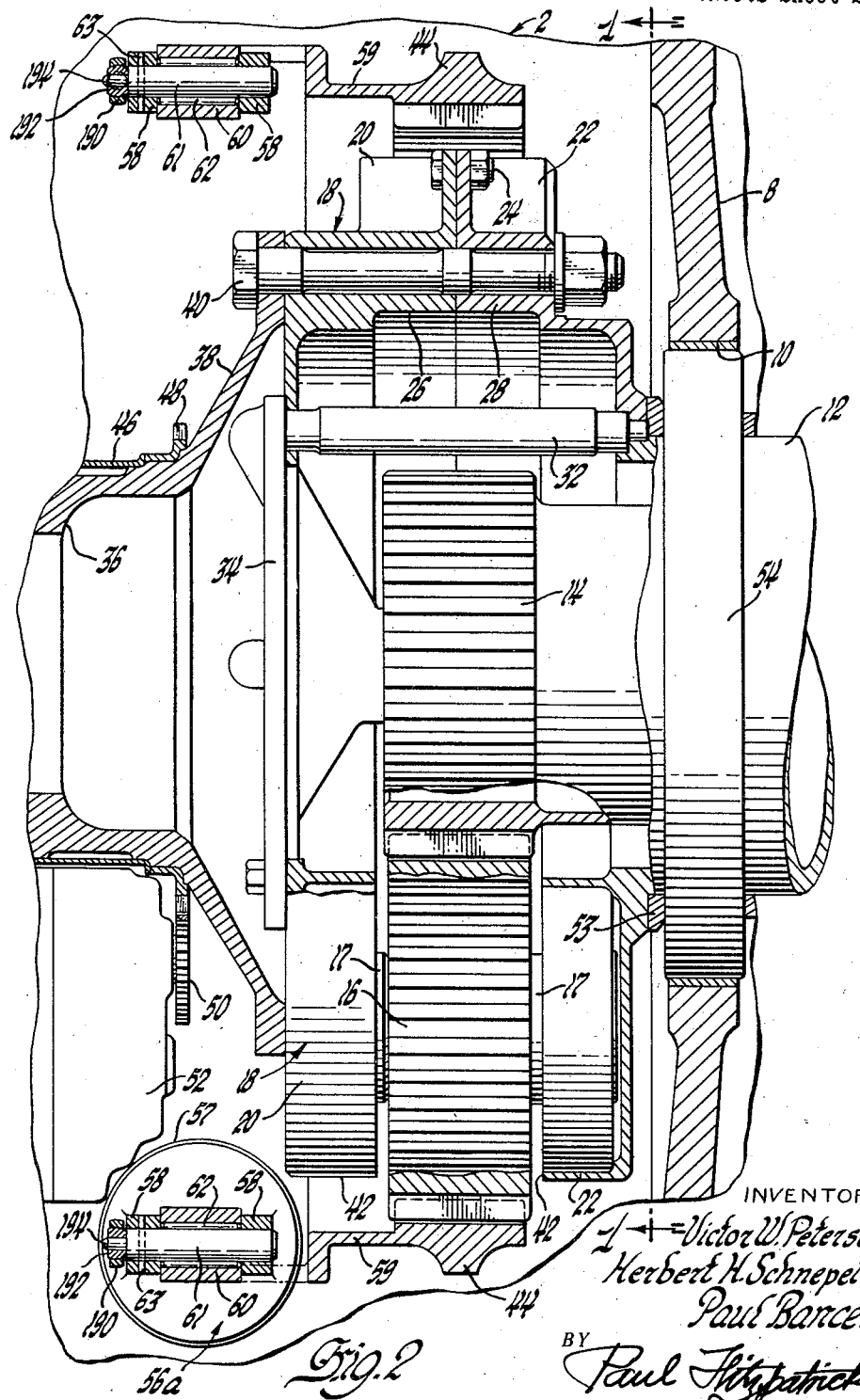

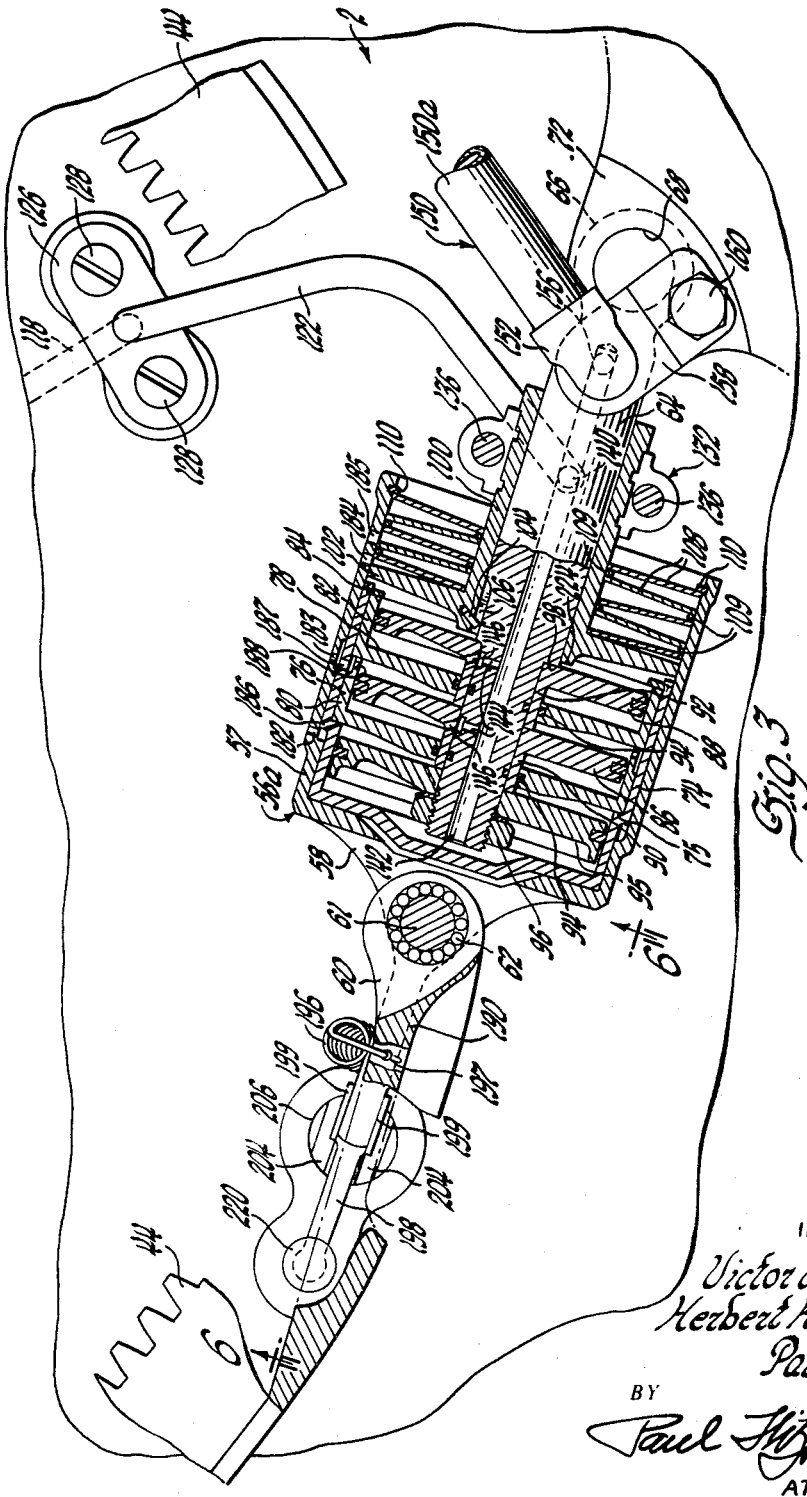

Aug. 23, 1960        V. W. PETERSON ET AL        2,949,771
TORQUE METER
Filed July 28, 1955                             5 Sheets-Sheet 4
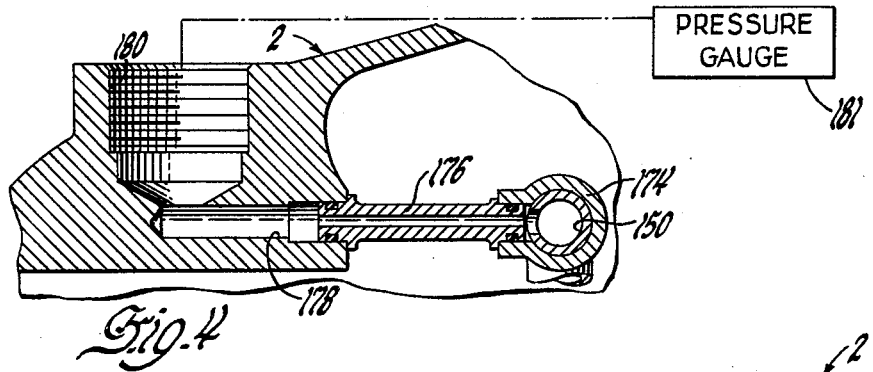
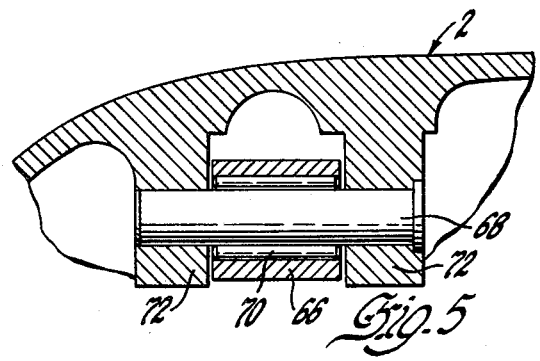
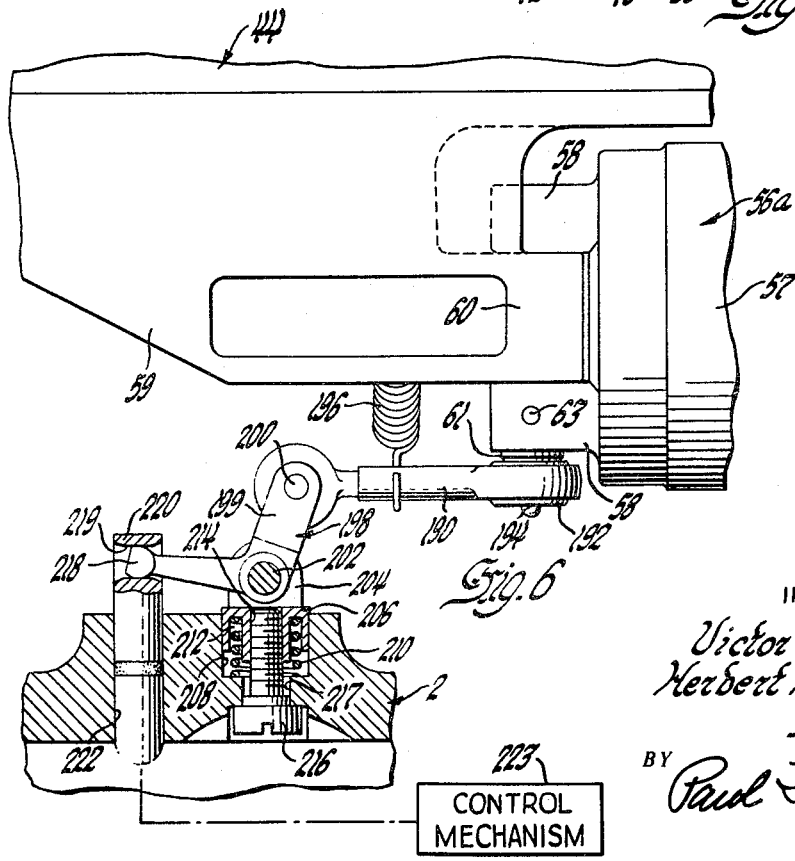
INVENTORS
Victor W. Peterson,
Herbert H. Schnepel &
Paul Barcet
BY
Paul Fitzpatrick
ATTORNEY Aug. 23, 1960 V. W. PETERSON ET AL 2,949,771
TORQUE METER
Filed July 28, 1955 5 Sheets-Sheet 5
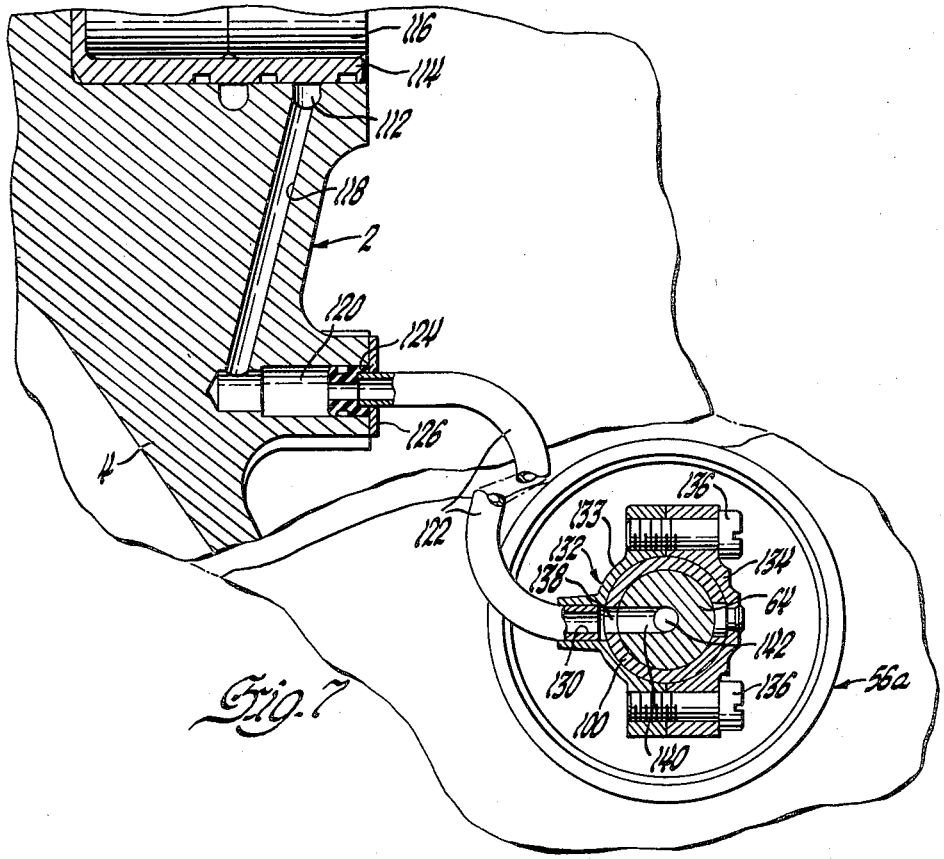
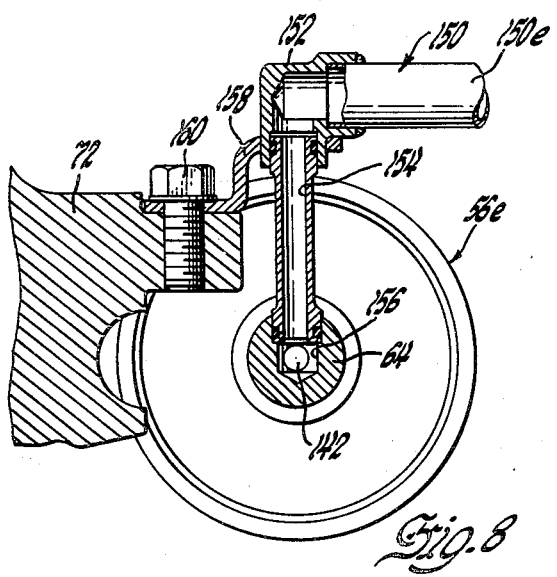
INVENTORS
Victor W. Peterson,
Herbert H. Schnepel &
Paul Barcel
BY
Paul Fitzpatrick
ATTORNEY

United States Patent Office 2,949,771
Patented Aug. 23, 1960

2,949,771
TORQUE METER

Victor W. Peterson, Herbert H. Schnepel, and Paul Bancel, Indianapolis, Ind., assignors to General Motors Corporation, Detroit, Mich., a corporation of Delaware Filed July 28, 1955, Ser. No. 524,984

6 Claims. (Cl. 73—136)

This invention relates to a torque meter and more particularly to a hydraulic torque meter and reverse torque indicator.

Aircraft engines, particularly those of the gas turbine propeller type, are provided with a torque meter for indicating and measuring positive torque, the torque output of the engine. The torque meter may also indicate negative torque, a condition which may happen when the propeller is windmilling or tending to drive the engine due to engine malfunctioning or failure. Windmilling of the propeller creates an unsafe drag on the aircraft. When the negative torque exceeds a predetermined set amount, the torque meter of this invention supplies a signal to a control mechanism which drives the propeller towards the feather position to reduce the drag to a safe value.

The primary object of this invention is to provide an improved torque meter for measuring and indicating positive torque and indicating negative torque. Another object of this invention is to provide a torque meter which will measure and indicate positive torque hydraulically and also indicate negative torque.

These and other objects of this invention will be readily apparent from the following specification and drawings, in which:

Figure 2 is an enlarged sectional view of a portion of Figure 1 on the plane indicated by line 2—2;

Figure 3 is an enlarged sectional view of a portion of Figure 1 showing one of the hydraulic cylinders of the torque meter;

Figure 4 is an enlarged sectional view of a portion of Figure 1 on the plane indicated by line 4—4;

Figure 5 is an enlarged sectional view of a portion of Figure 1 on the plane indicated by line 5—5;

Figure 6 is a view of a portion of Figure 3 taken on the plane indicated by line 6—6;

Figure 7 is an enlarged sectional view of a portion of Figure 1 taken on the plane indicated by line 7—7; and Figure 8 is an enlarged sectional view of a portion of Figure 1 taken on the plane indicated by line 8—8.

Figure 1:
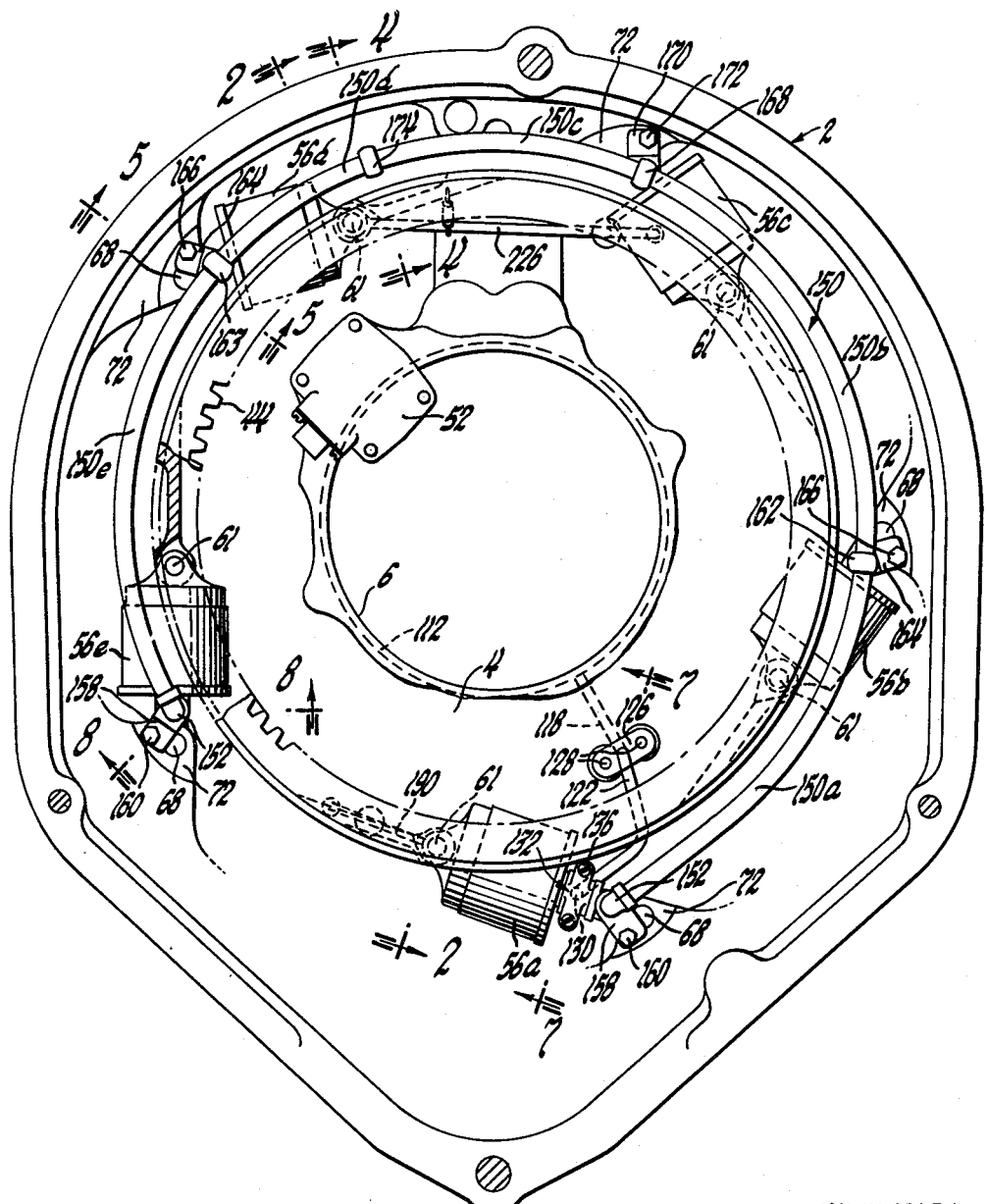
Figure 1 is a view of a portion of the forward frame of a gas turbine engine looking forward from an intermediate portion of the engine.

Referring now to Figures 1 and 2 of the drawings, the forward frame 2 of a gas turbine engine includes a downwardly sloping forward wall 4 provided with an opening 6, and an annular rear wall 8 provided with an opening 10. The turbine shaft 12 is rotatably mounted within opening 10 of the rear wall and terminates in a sun gear 14 which may be integral with the turbine shaft or may be separate and secured thereto in a suitable manner. The sun gear drives a number of planet pinions 16 rotatably mounted on shafts 17 which are supported within planet carrier housing 18. Housing 18 includes front and rear housing sections 20 and 22, respectively, which are bolted together at 24 intermediate the planet pinions and are provided with spaced annular flange portions 26 and 28 intermediate the planet pinions to space the housing sections. A number of lubricant tubes 32 supported by housing sections 20 and 22 receive lubricant from drilled passages within front cover plate 34 and lubricate the planetary gear system.

The propeller shaft 36 includes a rear outwardly flared flange portion 38 which is secured to the planet carrier housing 18 by a number of bolts 40 extending between housing sections 20 and 22. The planet pinions 16 extend outwardly through suitably shaped openings 42 in housing sections 20 and 22 and mesh with a ring gear 44 which is held substantially stationary to provide a reaction member for the planet pinions, as will be hereinafter described. A collar 46 fitting on the propeller shaft 38 includes a gear ring portion 48 which drives gear 50 of hydraulic gear pump 52. The rear housing section 22 mounts a spacer ring 53 bearing against the inner race of roller bearing 54 which supports shaft 12 within wall 8 of forward frame 2.

The turbine shaft 12 drives the sun gear 14. Since the planet pinions 16 mesh with the sun gear and ring gear 44, rotation of the sun gear causes the planets to walk around the sun gear and rotate the planet carrier housing 18 to drive the propeller shaft 36. The ring gear 44 provides a reaction member for the planet pinions, and movement of the planet pinions in one direction about the sun gear imparts a reaction force to the ring gear tending to drive it in the opposite direction about the sun gear. By providing a torque meter which is suitably calibrated to indicate and measure this reaction force, the engine torque output can be obtained. This reaction force may be termed "positive torque" since the engine is the driving member. However, should the propeller windmill and tend to drive the engine, the planet pinions will walk around the sun gear in the same direction as that when the engine is the driving member and will impart a reaction force to the ring gear tending to drive it in a direction opposite to that when the engine is the driving member. The torque meter may also indicate this reaction force which may be termed "negative torque" since the engine is now the driven member rather than the driving member.

As hereinbefore stated, the ring gear 44 is held substantially stationary to provide a reaction member for the planet pinions 16. Referring now to Figures 1, 2, and 3, five equally spaced hydraulic cylinders 56a, b, c, d, and e interconnect the ring gear and the forward housing 2. By mounting the ring gear on the frame of the engine through the hydraulic cylinders, the ring gear is self-aligning which minimizes localized loading. Each cylinder is the same, except in certain respects which will be hereinafter particularly pointed out and, therefore, only cylinder 56a will be particularly described. Each cylinder includes an outer shell 57 terminating in a pair of spaced cylindrical lugs 58. The ring gear includes spaced laterally extending flange portions 59 having cylindrical lugs 60 which are received between lugs 58 of shells 57. A stub shaft 61 extending through lugs 58 and 60 rotatably secures one end of each cylinder to the ring gear, with needle bearings 62 being provided between each shaft and lug 60. A pin 63 extending through one lug 58 and each stub shaft prevents withdrawal of the shaft unless required for disassembly. Each hydraulic cylinder also includes a central shaft member 64 terminating in a cylindrical lug 66, Figures 3 and 5, which is journalled on a stub shaft 68, with a needle bearing 70 being provided between the lug and the shaft. Shafts 68 are fixed within pairs of spaced lugs 72 formed integral with the outer frame 2 of the engine.

An inner shell 74 having an annular shoulder 75 is fitted within the outer shell 57. Pistons 76 and 78 fit within shell 74 and have peripheral flanges 80 and 82 which seat on the inner wall of shell 74. The pistons are fixed in place by split ring 84 which retains the pistons in engagement with each other and flange 80 in engagement with shoulder 75 of shell 74. Also fitting within shell 74 are pistons 86 and 88 having peripheral flanges 90 and 92 which fit within openings 94 in pistons 76 and 78 and seat on shaft member 64. Piston 95 seats on the inner wall of shell 74 and on shaft 64 and bears against flange 90 of piston 86. A nut 96 threaded on the end of shaft member 64 secures pistons 95, 88, and 86 on shaft member 64, with piston 88 seating against a shoulder 98 on the shaft member.

Thus, each cylinder includes two piston units which can be moved relative to each other; one piston unit including the outer and inner shells 57 and 74 and pistons 76 and 78, and the other piston unit including shaft member 64 and pistons 86, 88, and 95.

A sleeve member 100 encircles shaft member 64 and is provided with a piston portion 102 which seats on the inner wall of shell 57. The sleeve member is keyed on shaft member 64 for axial movement by a key 104 which fits within keyway 106. A number of Belleville washers 108 are spaced by rings 109 and fit between the inner wall of shell 57 and sleeve member 100. The forward washer bears against piston portion 102 of sleeve member 100, and a split ring 110 fixed within the inner wall of shell 57 retains the washers in place. Sleeve member 100 extends beyond the outer shell 57 of cylinder 56a only, but terminates at the end of shell 57 in the other cylinders 56b, c, d, and e.

Referring now to Figures 2, 7, and 8, the gear pump 52 provides a source of pressure fluid capable of withstanding maximum torque conditions. This fluid passes from the pump into passage 112 defined by a groove in the forward wall 4 of frame 2 which is closed by the outer race 114 of bearings 116 rotatably supporting the propeller shaft 36. The fluid passes from passage 112 into bore 118 in the forward wall 4 of the engine and then into bore 120 which opens to the rear surface of wall 4. A metal or plastic tube 122 has one end fitting within a sealing member 124 in bore 120, with the sealing member being held in place by bracket 126 secured to wall 4 by bolts 128, Figure 3. The other end of tube 122 fits within opening 130 of collar 132. Collar 132 includes collar sections 133 and 134 which are bolted together at 136 to secure the collar on sleeve member 100, as can be seen particularly in Figures 3 and 7. An opening 138 in sleeve member 100 connects tube 122 with a radial bore 140 formed in shaft member 64. Bore 140 connects with a central bore 142 which extends the full length of shaft member 64, as can be seen in Figure 3. Shaft member 64 is provided with radial passages 144 which connect with angular passages 146 in flanges 90 and 92 of piston members 86 and 88. Passages 146 allow pressure fluid to pass from bore 142 into the space between piston members 76 and 86 and piston members 78 and 88, with pressure fluid also being allowed to pass between piston 95 and the inner shell 74 through bore 42.

Cylinder 56a is the metering cylinder, as will be hereinafter explained. The other cylinders 56b, c, d, and e, receive metered pressure fluid from cylinder 56a through a pressure fluid manifold and do not include collar 132 or tube 122, and have their sleeve members 100 terminating at shell 57 instead of extending beyond this shell as in cylinder 56a. Referring now to Figures 1, 3, 4, and 8, a pressure fluid manifold 150 interconnects all of the spaced cylinders and includes manifold sections 150a, b, c, d, and e. Referring now particularly to Figures 3 and 8, the connection between manifold section 150a and cylinder 56a is the same as that between manifold section 150e and cylinder 56e. An elbow fitting 152 receives one end of manifold sections 150a and 150e and also one end of a tube 154 which extends between the fitting and a radial bore 156 in each shaft member 64 which connects with each bore 142. The elbow fittings are supported by brackets 158 bolted to a lug 72 at 130. The other ends of manifold sections 150a and 150e are received in T fittings 162 and 163 respectively, which are supported by brackets 164 similar to bracket 158 and bolted to a lug 72 at 166. A tube which is the same as tube 154 extends between each fitting 162 and 163 and a radial bore which is the same as radial bore 156 connects with the bore 142 in each cylinder 56b and 56d. Manifold section 150b extends between fitting 162 and T fitting 168, supported by a bracket 170 bolted to a lug 72 and 172, and connecting the pressure fluid manifold with cylinder 50c in the same manner as cylinders 56a and 56e are connected to the manifold. Manifold sections 150c and 150d extend from fittings 168 and 163, respectively, to a T fitting 174, Figure 4. A tube 176 similar to tube 154 extends from fitting 174 to a bore 178 in the frame 2. Bore 178 connects with a threaded bore 180 which opens to the upper surface of frame 2. A pressure gauge 181 which is calibrated to measure positive torque by fluid pressure is threaded into bore 180.

As previously stated, the hydraulic torque meter of this invention indicates and measures positive torque, which is the torque output of the engine. Referring now to Figures 1, 3, and 7, the operation of the hydraulic torque meter will be described. Constant pressure fluid from gear pump 52 passes through passage 112, bore 118, and bore 120 to tube 122 which connects with opening 138 in sleeve member 100 of cylinder 56a. Sleeve member 100 is keyed on shaft member 64 for axial movement relative to the member. Assuming now that the engine is driving the sun gear clockwise which in turn drives the planet pinions and propeller shaft, the reaction force on the gear ring caused by movement of the planet pinions around the sun gear tends to drive the ring gear counterclockwise about the axis of the sun gear, as viewed in Figures 1 and 3. This movement of the ring gear will shift the outer and inner shells 57 and 74 and pistons 76 and 78 to the right, as viewed in Figures 1 and 3, and will also move sleeve member 100 to the right as the edge of shell 74 contacts the piston portion 102 of the sleeve member. Movement of sleeve member 100 to the right will move opening 138 into various degrees of registry with radial bore 140 of the shaft member to meter fluid under varying pressure into bore 142. The metered fluid will pass from bore 142 into the space between pistons 78 and 88 and pistons 76 and 86 through passages 144 and 146 and pass into the space between piston 95 and shell 74 to oppose movement of the ring gear and tend to hold the ring gear substantially stationary. The fluid metered into bore 142 of cylinder 56a will also pass through bore 156, tube 154 and elbow 152 into manifold 150 and thence to the other cylinders which will also act to oppose movement of the ring gear in the same manner.

The extent of the reaction force of the ring gear 44 is responsive to the torque output of the engine and determines the degree of registry of opening 138 with bore 140 in shaft member 64 of cylinder 56a. The pressure of the fluid within cylinder 56a, manifold 150, and the other cylinders will thus vary responsively with the torque output of the engine. This pressure is measured by the calibrated pressure gauge 181 in bore 180 in communication with manifold 150. If the torque output of the engine is low, the reaction force of the ring gear will not move opening 138 into complete registry with bore 140 and the pressure of the fluid metered into bore 142 of cylinder 56a and passing to the remaining cylinders through manifold 150 will be less than maximum pressure when the engine is putting out maximum torque. The pressure of the fluid from gear pump 52 must be capable of withstanding maximum torque conditions when opening 138 is in complete registry with bore 140.

Referring now particularly to Figure 3, shell 57 is provided with openings 182, 183, 184, and 185, and shell 74 is provided with openings 186 and 187 in registry with openings 182 and 183, respectively, with flange 80 of piston 76 also having an opening 188 in registry with openings 183 and 187. Openings 182 and 186 vent the space between pistons 76 and 95 and drain off any fluid collecting in this space, and openings 183, 187, and 188 perform the same function for the space between pistons 78 and 86. Openings 184 and 185 vent the space between piston 88 and piston portion 102 of sleeve member 100 by slots (not shown) and also drain off any fluid collecting in this space.

Although opening 138 in sleeve member 100 is shown in Figure 7 in complete registry with bore 140, this condition only happens under maximum flow requirements. Opening 138 is normally to the left of bore 140, as viewed in Figure 3 and out of registry with the bore. During movement of shells 57 and 74 and sleeve member 100 to the right, as viewed in Figure 3, to place opening 138 in various degrees of registry with bore 140, the Belleville washers 108 move as a unit with the sleeve member and the shells and do not assist or oppose the reaction force of the ring gear. However, as the shells move to the left, as viewed in Figure 3, under low or zero positive torque conditions, the Belleville washers act on piston portion 102 to move sleeve member 100 to the left to move opening 138 out of registry with bore 140.

As previously mentioned, the torque meter of this invention also includes a reverse torque indicator. Referring now to Figures 1, 2, 3, and 6, a lever 190 is rotatably mounted on stub shaft 61 of cylinder 56a by means of a ball and socket connection 192 between the lever and extension 194 of shaft 61. The lever is supported by a tension spring 196 having one end hooked around the lever and the other end hooked to flange 59 of ring gear 44 at 197. Lever 190 is pivoted between the bifurcated arms 199 of bell crank 198 at 200. Bell crank 198 is pivotally supported on pin 202 which extends between lugs 204 of support 206. Support 206 fits within a shouldered bore 208 of frame 2 and a compression spring 210 seating on the shoulder of the bore and within annular groove 212 of the support urges the support outwardly with respect to the frame member. The support includes a threaded bore 214, and a stud 216 cooperates with the threaded bore to retain the support 206 in place with bore 208 against the action of spring 210. The stud and compression spring provide an adjustable mounting for support 206, since the stud fits within shouldered bore 217 in frame 2 but is threaded only in support 206. The other arm of the bell crank terminates in a ball extension 218 which is received within a socket 219 formed in one end of plunger 220 which is mounted within a bore 222 of frame 2.

Referring now to Figures 1 and 3, if the propeller windmills clockwise and tends to drive the engine, the reaction force will tend to drive the ring gear 44 clockwise about the axis of the sun gear and will tend to move the outer shell 57 to the left, as viewed in Figure 3. This movement of the outer shell will cause the Belleville washers 108 to be compressed between split ring 110 and piston portion 102 of sleeve member 100, as the hub portion 224 of sleeve 100 bears against the rear face of piston 88 which is fixed on shaft member 64. The entire reverse torque of the engine is opposed by the Belleville washers, and the actuation of the reverse torque indicator is controlled by the compression of the washers. The Belleville washers or other spring arrangements can be preset to determine the point at which actuation occurs. As the outer shell 57 is moved to the left, as viewed in Figure 3, lever 190 will also be shifted to the left to cause bell crank 198 to pivot about pin 202 and move plunger 220 inwardly from within bore 222. The plunger may actuate a suitable control mechanism 223 to feather the prop and thus stop windmilling or the control mechanism may actuate a suitable instrument which will indicate to the pilot that the propeller is windmilling and tending to drive the engine.

Referring now particularly to Figure 1, another lever 226 similar to lever 190 has one end connected to stub shaft 61 of cylinder 56d in the same manner as lever 190 and the other end connected to a bell crank and a plunger in the same manner as lever 190. The full details of this lever are not shown since it is the same as lever 190. The plungers operated by both levers may actuate the same control mechanism and the same indicator gauge or may actuate separate indicator gauges.

Thus, this invention provides an improved hydraulic torque meter and reverse torque indicator which will measure and indicate positive torque and which will also indicate negative torque. Although the torque meter of this invention has been shown in conjunction with a planetary gear transmission of a gas turbine propeller aircraft engine, it is obvious that the torque meter has many other varied uses in installations wherein it is desired to measure and indicate positive torque of a reaction member and also to indicate negative torque of this member.

Although a specific embodiment of this invention has been shown and described, various changes and modifications may be made within the scope and spirit of the invention without departing from it.

We claim:

1. In combination with a reaction member subject to positive and negative torque conditions, a torque meter comprising fluid pressure responsive means connected to said reaction member for opposing movement of said reaction member under positive torque conditions, resilient means connected to said member for providing a predetermined resistance to movement of said member under negative torque conditions, pressure control means responsive to movement of said member under positive torque conditions for supplying fluid under pressure to said pressure responsive means to balance said positive torque, means for measuring said fluid pressure to indicate the relative value of said positive torque, and means independent of said pressure measuring means connected to said member responsive to a predetermined movement of said member against said resilient means for indicating negative torque conditions sufficient to overcome said predetermined resistance of said resilient means.

2. In combination with a reaction member subject to positive and negative torque conditions, a torque meter comprising a source of fluid under pressure, fluid pressure operated means operatively connected to said reaction member to oppose movement of said reaction member under positive torque conditions, variable orifice valve means operative upon movement of said reaction member under increasing positive torque conditions to meter fluid to said fluid pressure means, the fluid pressure within said fluid pressure means varying responsively to said positive torque conditions, resilient means operative upon movement of said reaction member under decreasing positive torque conditions to close said variable orifice valve means, said resilient means providing a predetermined resistance to movement of said reaction member under negative torque conditions, whereby negative torque greater than a predetermined amount will cause movement of said reaction member against said resilient means, and indicator means responsive to movement of said reaction member against said resilient means under negative torque conditions for indicating a negative torque condition greater than a predetermined amount.

3. In combination with a reaction member subject to positive and negative torque conditions, a torque meter comprising, fluid pressure operated means operatively connected to said reaction member including a piston enclosed within a pressure cylinder means, said piston means being relatively stationary and said cylinder means being relatively movable, said cylinder means positioned for movement with said reaction member under positive torque conditions, a source of pressure fluid, normally closed variable orifice valve means operative upon movement of said reaction member under positive torque conditions to meter fluid under pressure from said source to said fluid pressure means to act between said piston and cylinder means to oppose the movement of said reaction member under said positive torque conditions, the fluid pressure in said fluid pressure means varying responsively to changes in said positive torque conditions, resilient means providing a predetermined resistance to movement of said reaction member under said negative torque conditions, said resilient means also biasing said variable orifice valve to its closed position cutting off pressure to said fluid pressure means under negative or decreasing positive torque conditions.

4. In combination with a reaction member subject to positive and negative torque conditions, a torque meter comprising, a plurality of fluid pressure operated means operatively connected to said reaction member, a source of fluid under pressure, pressure control means operative upon movement of said reaction member under increasing positive torque conditions to supply fluid under increasing pressure to one of said fluid pressure means, means interconnecting said one fluid pressure means and the other fluid pressure means allowing said fluid under pressure to act on said other fluid pressure means whereby all of said fluid pressure means oppose movement of said reaction member, first resilient means operatively connected to said pressure control means operative upon movement of said reaction member under decreasing positive torque conditions to decrease the pressure in said fluid pressure means, said resilient means providing a predetermined resistance to movement of said reaction member under negative torque conditions, and additional resilient means operatively connected to each of said other fluid pressure means, each providing a predetermined resistance to movement of said reaction member under negative torque conditions whereby negative torque greater than a predetermined amount will cause movement of said reaction member against said first and said additional resilient means.

5. In combination with a relatively movable torque member subject to movement in one direction by a positive force and in the opposite direction by a negative force, a torque meter for measuring the positive force and indicating negative force on said torque member including a relatively stationary member, means for resisting movement of said torque member in said one direction including a pair of fluid pressure members forming a fluid chamber therebetween, one of said pressure members operatively connected for movement in at least one direction by said torque member and the other pressure member connected to said stationary member, a source of fluid under pressure, valve means for metering pressure to said chamber, means carried by said one pressure member for transmitting movement of said torque member in said one direction to said valve means to open the same to increase the pressure in said chamber to thereby oppose movement in said one direction, means for resisting movement of said torque member in said other direction including resilient means interposed between said torque member and said valve means, said resilient means urging said valve means with a predetermined force to a position to cut off pressure from said source to said chamber upon a decrease in positive force on said torque member, stop means for limiting movement of said valve means relative to said stationary member, said resilient means, valve means and stop means together acting to prevent movement of said torque member in said other direction by a negative force less the predetermined force of said resilient means, means for measuring the pressure in said chamber to indicate positive force on said torque member, and indicator means responsive to movement of said torque member in said opposite direction against said resilient means by a negative force greater than said predetermined force.

6. In combination with a relatively movable torque member subject to movement in one direction by a positive force and in the opposite direction by a negative force, a torque meter for measuring the positive force and indicating negative force on said torque member including a relatively stationary member, means for resisting movement of said torque member in said one direction including a pair of opposed pistons forming a fluid chamber therebetween, one of said pistons operatively connected for movement by said torque member and the other piston connected to said stationary member, a source of fluid under pressure, valve means for metering pressure to said chamber, means carried by said one piston for transmitting movement of the torque member in said one direction to said valve means to open the same to increase the pressure in said chamber to thereby oppose movement in said one direction, means for resisting movement of said torque member in said opposite direction including a preloaded spring interposed between said torque member and said valve means, said preloaded spring urging said valve means to a position to cut off pressure from said source to said chamber upon a decrease in positive force on said torque member, stop means for limiting movement of said valve means relative to said stationary member, said spring, valve means and stop means together acting to prevent movement of said torque member in said opposite direction by said negative force until said negative force is sufficient to overcome the preload force of said spring, means for measuring the pressure in said chamber to indicate positive force on said torque member, and indicator means responsive to movement of said torque member against said spring in said opposite direction by a negative force greater than said preload force.

References Cited in the file of this patent

UNITED STATES PATENTS

| | | |
|---|---|---|
| 2,289,285 | Chilton | July 7, 1942 |
| 2,518,708 | Moore | Aug. 15, 1950 |
| 2,562,710 | Gallo | July 31, 1951 |
| 2,715,834 | Chamberlin | Aug. 23, 1955 |

UNITED STATES PATENT OFFICE

CERTIFICATE OF CORRECTION

Patent No. 2,949,771            August 23, 1960

Victor W. Peterson et al.

It is hereby certified that error appears in the printed specification of the above numbered patent requiring correction and that the said Letters Patent should read as corrected below.

Column 3, line 57, for "42" read -- 142 --; column 4, line 1, for "130" read -- 160 --.

Signed and sealed this 4th day of April 1961.

(SEAL)
Attest:    ERNEST W. SWIDER

Attesting Officer                          ARTHUR W. CROCKER
                                                   Acting Commissioner of Patents